May 22, 1962  E. E. PAULSON ETAL  3,035,759
ROTOR AND STATOR CONSTRUCTION
Filed Nov. 13, 1957
Fig 1
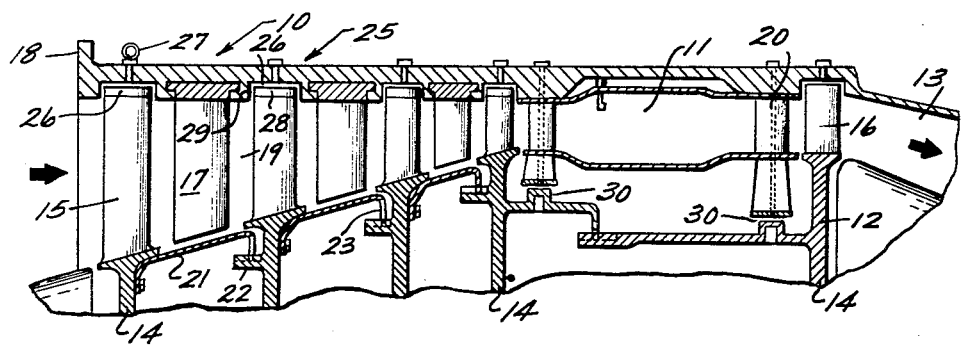
Fig 2
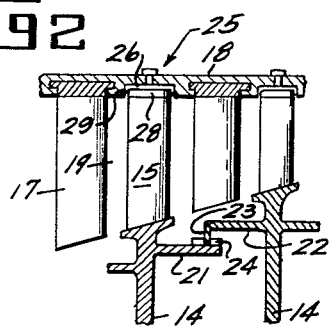
Fig 3
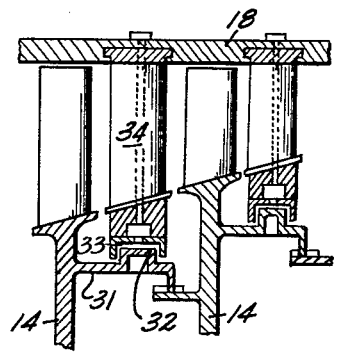
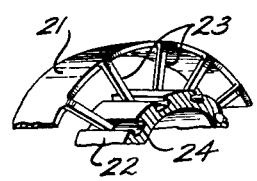
Fig 4
INVENTORS.
HAMAD J. SMILE
EMIL E. PAULSON
BY John F. Cullen
ATTORNEY

United States Patent Office 3,035,759
Patented May 22, 1962

3,035,759
ROTOR AND STATOR CONSTRUCTION
Elmir Edward Paulson, Madeira, and Hamad Jasper Smile, Cincinnati, Ohio, assignors to General Electric Company, a corporation of New York
Filed Nov. 13, 1957, Ser. No. 696,145
10 Claims. (Cl. 230—122)

The present invention relates to a rotor and stator construction, and, more particularly, to a combination construction of the type that has particular use in high speed, lightweight applications such as may be employed in aircraft powerplants. The invention is directed to a rotor and stator combination employing aeriform, such as air, bearings as the sole means of rotor support during rotation.

For purposes of illustration only, the present invention is described in connection with aircraft rotating machinery such as an axial flow compressor which may be found in jet engines of the gas turbine type, or similar reaction-type powerplants for aircraft use. This is intended to be purely illustrative and the application of the invention may be employed in any high speed lightweight rotating machinery as will be apparent hereinafter.

In a conventional jet engine powerplant which we use only to illustrate the invention, the rotating elements comprise the compressor and turbine. Axial flow compressors are generally preferred in modern day practice to the old type centrifugal flow compressors. Consequently, the compressor generally comprises a series of axially aligned wheel disks, each of which carries peripheral vanes to co-operate with stationary vanes on the stator and provide a plurality of stages of compression by which the incoming air is compressed for use in the combustion area. Similarly, the turbine section has one or several stages in axial alignment in the passage of the heated gas from the combustion area, to extract energy for driving the compressor after which the gas is exhausted generally through a nozzle in aircraft use. Since the turbine section may be quite similar to the compressor section differing usually in using fewer wheel disks or stages, the description herein will be devoted primarily to the compressor section to illustrate the invention.

Normally, the spaced wheel disks of the compressor are rigidly attached to one another to provide a large rigid rotor unit. Suitable conventional bearings, such as oil lubricated bearings, support the rotor centrally and at each end in the stator and, in some cases, one end bearing may be moved downstream to the turbine to provide a two-bearing powerplant. These types of conventional structure are very difficult to balance dynamically. It is well known that the larger the rotating unit, the more difficult it is to balance. As a result, vibrations are set up which can be destructive of the rotating elements. In addition, an axial thrust is created on the rotating elements due to higher air pressure at one end of the rotor than at the other end, and undesirable surges are often set up during the passage of the air through the rotating unit.

The use of conventional bearings requires oil lines, sumps, and pumps to carry lubricating fluid to the bearings and all this structure adds weight to the powerplant. Also, if in some applications, radioactivity is present, it hastens the breakdown of the oil and consequent lubrication problems. High temperature operation, which is common to many present day powerplants, hastens the breakdown of oils and greases and increases the lubrication problems as well as problems due to the thermal expansion between rotating and stationary parts.

Further, in the assembly of such conventional rotors, the stack-up errors, which are dimensional tolerance errors in each individual part, such as the wheels, becomes cumulative resulting in larger clearances than would normally be required or desired if the errors could be eliminated.

Accordingly, it is the main object of the present invention to provide a rotor and stator construction which is flexible and non-rigid and utilizes aeriform bearings as the sole means of support of the rotor in the stator during operative rotation.

Another object of the invention is to provide such a rotor and stator construction which eliminates the need for conventional bearings with their attendant lubrication lines, sumps, and pumps, and uses aeriform bearings during rotation.

A further object of the invention is to provide a flexible rotor and stator construction which lends itself to lightweight and high speed operations, and eliminates the vibrational and thermal problems encountered with conventional structure. In combination with the novel bearing structure, the rotor and stator construction also lends itself to high temperature operation.

Briefly stated, our invention provides a rotor and stator construction wherein the rotor is made up of a series of axially aligned and axially spaced short disk shafts that are free from any rigid connection with the adjacent disk to provide a completely flexible rotor. In addition, each of the disks is preferably independently supported in the stator by means of aeriform or air bearings.

While the specification concludes with claims particularly pointing out and distinctly claiming the subject matter which we regard as our invention, it is believed the invention will be better understood from the following description taken in connection with the accompanying drawing, in which:

FIGURE 1 is a partial diagrammatic view in cross section of a flexible rotor and stator construction of the instant invention;

FIGURE 2 is a partial view in cross section of a modified flexible connection between the rotor disks;

FIGURE 3 is a partial view of a modified bearing arrangement, and

FIGURE 4 is a partial perspective view illustrating the flexible connection.

Referring first to FIGURE 1, the invention is illustrated as it may be applied to a typical powerplant such as a gas turbine type jet engine as may be used in aircraft. Incoming air, shown by the arrow, enters the compressor section which may be of the axial flow type and is generally indicated at 10, where it is compressed and passed to a combustion section 11. In the combustion section heat is added and the fluid is passed downstream to turbine section 12 where energy is extracted to drive compressor 10. The fluid is then directed by duct 13 to a point of use which, in aircraft usage, may be through an exhaust nozzle not shown.

The rotating elements in the sections comprising compressor 10 and turbine 12 are normally constructed of a series of axially aligned and axially spaced wheel disks 14 which may vary in number depending upon the engine characteristics. Four compressor wheel disks and one turbine wheel disk are shown in FIGURE 1, although this number may obviously be varied as desired. Each wheel disk includes suitable rotor or compressor vanes 15 or turbine vanes or blades 16 mounted on the periphery of the wheel, all in the conventional manner. In order to obtain compression of the incoming air, suitable stator vanes 17 are disposed between the rotor vanes, and the stator vanes may be connected by any suitable means well known in the art to the stator, as shown by casing 18. Thus, the rotor and stator define a fluid passage 19 for the compression of the incoming air in the compressor section. Suitable nozzles 20 direct the heated fluid to the turbine 16 in the turbine section.

The structure thus far described is conventional and well known in the art.

Normally, the rotating structure just described is supported centrally by suitable bearings, not shown, and at the forward and aft end of the compressor and turbine respectively, and in some cases, an intermediate thrust bearing is used at the downstream end of the compressor. In addition, the normal construction connects the wheel disks 14 together by a torque tube to form a rigid barrel-like structure of the rotating parts. The present invention dispenses with this rigid construction and the normal types of bearings.

A short shaft may be rotated at extremely high speeds before encountering resonant vibrational problems. Thus, a flexible rotor constructed of a series of short shaft-like members can be rotated at much higher speeds than can a solid rigid-type rotor and not be subject to the vibrational problems normally encountered. In other words, the critical speed, which is the speed of resonant frequency of the member, is so high that it is above any encountered in operation and, for all practical purposes, can be neglected in a short shaft arrangement. The flexible rotor member of the present invention is so constructed. Each wheel disk 14 is preferably independent of any rigid connection with its adjacent wheel disk. To this end, wheel disk 14 may carry on one side of the wheel a torque transmitting member 21, and on the other side, a similar torque transmitting member 22 that may be suitably fastened to the wheel by bolts or welding, or may be integral therewith. These members are thin enough to be flexible in the transverse direction or, in other words—as shown in FIGURE 1—they are designed to bend in a radial direction. In order to transmit torque from one disk 14 to the adjacent disk, the torque transmitting members 21 and 22 are interconnected by a strap or link 23 in the manner of flexible spokes in a wheel. This is more clearly shown in FIGURE 4. Obviously, strap 23 may take many different mechanical forms or linkages to provide the flexible connection and the illustration in FIGURE 4 is merely illustrative of a typical simple and straightforward arrangement. Preferably, strap 23 may be connected to either of the torque members 21 or 22 and is slidable axially in the other in a slot 24. This provides freedom for axial self-adjustable expansion without detracting from the effectiveness of the flexible or resilient connection between adjacent disks. Any suitable means may be provided for the axial expansion, only one of which is illustrated in FIGURES 1, 2, and 4 as typical. Thus, it can be seen that each wheel disk is rotatable relative to the adjacent wheel to a slight amount until the straps begin transmitting torque between the wheels through this flexible connection. As illustrated in FIGURE 1, the flexible torque transmitting means connecting the adjacent disks may be provided at the outer wheel extremity or may be provided radially inwardly in a similar manner, as shown in FIGURE 2. In either case, a flexible connection is provided to avoid a rigid construction and thus a rigid rotor. The construction illustrated permits each wheel to independently adjust itself relative to the adjacent wheel under operating conditions and avoid the stack-up errors, balancing problems, and consequent vibration normally present in a rigid construction.

In order to support the novel rotor structure just described and illustrated, in its stator 13, we provide a series of axially spaced aeriform supporting bearings generally indicated at 25. The term "aeriform" is intended to include both a gas including air, and a mist which may be desired under some circumstances. The use of these bearings eliminates the need for conventional bearings with their attendant lines, sumps, and pumps, and permits the short shaft construction referred to above. Each wheel disk may be supported preferably independently of the adjacent wheel disk so that, in effect, the entire rotor is made up of a series of short shafts which are the wheels themselves. Obviously, many forms of aeriform bearings 25 may be used in the invention disclosed. As shown in FIGURE 1, these bearings may comprise annular recesses 26 in stator 13, which are designed to be pressurized with air from any suitable source, such as the compressor, through line 27. In the form illustrated in FIGURES 1 and 2, the ends of the rotor blades have a shroud 28 extending into the recess 26 to provide a peripheral supporting surface. Thus, the casing or stator itself and the shrouds form the races of the bearings and the pressurized air forms the supporting medium as well as a seal. In this respect, the support is different from the usual center support where bearings are supported from the casing indirectly by struts or the like. In the invention, then, the casing or stator is the supporting means directly.

The axial thrust normally present in a construction of the type illustrated in FIGURE 1 is usually counteracted by a conventional well known balance piston arrangement or by making the intermediate bearing at the downstream end of the compressor a thrust bearing. The instant invention dispenses with the necessity for either one of these means for counteracting axial thrust. The axial thrust is counteracted by the aforementioned extension of shroud 28 in the annular recess 26 to provide a side air bearing 29 which acts as a thrust bearing for each wheel disk 14. It is to be noted that the normal supporting function for rotation only may be performed by an air bearing such as 30, suitably placed for individual wheel support which type bearing offers no counteraction to the thrust. Thus, a combination of these aeriform bearings may be used in any manner desired. As illustrated, bearing 30 merely supports the rotor for rotation and the bearings on the end of the wheel disks 14 support the disk for rotation as well as absorbing axial thrust.

FIGURE 3 illustrates a modification wherein the air bearings are shown in a different form. In this figure, an extension 31 may be provided near the periphery of the wheel 14 which extension has a load-supporting peripheral surface 32 co-operating with an annular recess 33 which is pressurized by air in a manner similar to that shown in FIGURE 1 for support in substantially the same manner. In this modification, the annular recess may be provided at the radially inner ends of the stator including the stator vanes 34, thus, as shown, at least one peripheral surface on each wheel is supported by an air bearing. It will be obvious that the air bearings, while preferably used for each wheel as illustrated, may be used alternately on the wheels, in which case pairs of adjacent wheels can be connected together or preferably can be flexibly connected, as illustrated.

It will be seen that the construction described permits each wheel disk to center itself during rotation by reason of the air bearing supporting means as the sole support of the rotor and because of the flexible connection between adjacent disks. Thus, smaller clearances can be used, deformation of the parts can be tolerated, and the problems of migration, which is movement of the parts to create rub between rotating parts and static parts, is eliminated. Because of the short shaft arrangement, the vibration problems are considerably reduced, if not entirely eliminated. Any bending due to axial pulsations in the engine or aerodynamic pulsations due to pressure changes which tend to move the rotor as a whole are also eliminated by the supporting and flexible connecting structure described. Blade flutter, which is the tendency of the blade or vanes to move due to the resiliency when long thin parts are used, is eliminated because of the solid supporting air bearings near the end of the disks. Any bending of the vanes due to aerodynamic loading is likewise eliminated because of the bearing support at the vane itself or very close to the vane rather than at the conventional rotor shaft.

The rotor structure described will, of course, settle when the rotating parts are at rest. Thus, auxiliary air must be supplied or auxiliary self-lubricating bearings may be used when the engine is started or at rest, to support the rotor in the stator. If auxiliary bearings are used, they will, of course, be used only at rest or in starting and will be inactive when the air bearings come into use. With the air bearings the peripheral surface area will determine the air pressure necessary. In other words, if the air bearing peripheral surface is made large, less air pressure is required.

The instant invention further provides a rotor and stator construction which is completely flexible and supported solely by aeriform bearings, which bearings will generally be air bearings. Thus, the invention eliminates the usual lines, sumps, and pumps and permits trouble free operation at much higher speeds and higher temperatures than heretofore possible. There is practically no limit to the temperature the air bearings may attain except that which is limited by the material itself. The hotter the air becomes, the more support it provides. In addition, a structure of the type disclosed can be made to extremely close tolerances because of its built-in self-adjusting feature.

While we have hereinbefore described our invention in connection with a particular application, it is to be understood that the application is merely illustrative, and the invention is applicable to any rotor and stator construction, and various modifications and changes may occur to those skilled in the art without departing from the scope of the invention defined in the appended claims.

We claim:

1. A rotor and stator construction for a powerplant comprising, a rotor including a plurality of axially aligned and axially spaced wheel elements, torque transmitting means flexible in a direction transverse to rotation and axially self-adjustable interconnecting the spaced elements for rotation together, a stator surrounding the rotor and having separate axially spaced casing means supporting the rotor for rotation in the stator.

2. Apparatus as described in claim 1 wherein the powerplant is a gas turbine powerplant.

3. A rotor and stator construction for a powerplant comprising, a rotor including a plurality of axially aligned and axially spaced wheel elements, torque transmitting means flexible in a direction transverse to rotation and axially self-adjustable interconnecting the spaced elements for rotation together, a stator surrounding the rotor and having separate axially spaced aeriform fluid supporting means forming bearings with the rotor.

4. A rotor and stator construction for a powerplant comprising, a rotor including a plurality of axially aligned and axially spaced wheel elements, torque transmitting means flexible in a direction transverse to rotation and axially self-adjustable connecting adjacent elements for rotation together, a stator surrounding the rotor and having separate axially spaced aeriform fluid supporting means acting on each wheel and forming the sole bearings with the rotor.

5. A rotor and stator construction for a gas turbine type powerplant comprising, a rotor including a plurality of axially aligned and axially spaced wheel disks, each wheel having at least one peripheral surface thereon, torque transmitting means flexible in a direction transverse to rotation and axially self-adjusting connecting adjacent disks for rotation together, a stator surrounding the rotor and having separate axially spaced pressurized air supporting means acting on the peripheral surface of each wheel to support the rotor in the stator solely by the air during rotation.

6. A rotor and stator construction for a gas turbine type powerplant comprising, a rotor including a plurality of axially aligned and axially spaced wheel disks, each wheel having at least one peripheral surface thereon, torque transmitting means on each wheel flexible in a direction transverse to rotation and axially self-adjustable connecting it to the adjacent wheel in a driving connection therewith, a stator surrounding the rotor, a separate recess containing pressurized air in the stator opposite the peripheral surface of each wheel to support each wheel independently in the stator solely by air during rotation.

7. A rotor and stator construction for a gas turbine type powerplant comprising, a rotor including a plurality of axially aligned and axially spaced wheel disks with radially extending vanes thereon, each wheel having at least one peripheral surface thereon, torque transmitting means on each wheel flexible in a direction transverse to rotation and axially self-adjustable connecting it to the adjacent wheel in a driving connection therewith, a stator surrounding the rotor and including radially extending vanes thereon co-operating with the rotor vanes, the stator and rotor defining a working fluid passage therebetween through the vanes, a separate annular recess containing pressurized air in the stator opposite the peripheral surface of each wheel to support each wheel independently in the stator solely by air during rotation.

8. A rotor and stator construction for a gas turbine type powerplant comprising, a rotor including a plurality of axially aligned and axially spaced wheel disks with radially extending vanes thereon, the spaced wheel disks forming an axial flow compressor section and turbine section, each wheel having at least one peripheral surface thereon, torque transmitting means on each wheel flexible in a direction transverse to rotation and axially self-adjustable connecting it to the adjacent wheel in a driving connection therewith, a stator surrounding the rotor and including radially extending vanes thereon co-operating with the rotor vanes, the stator and rotor defining a working fluid passage therebetween through the vanes, a separate annular recess containing pressurized air in the stator opposite the peripheral surface of each wheel, each peripheral surface extending into its opposite recess to form an air bearing therewith and support each wheel independently in the stator solely by air during rotation.

9. A rotor and stator construction for a gas turbine type powerplant axial flow compressor comprising, a rotor including a plurality of axially aligned and axially spaced wheel disks, compressor rotor vanes radially extending from the periphery of each wheel, peripheral shroud means carried by the vanes, torque transmitting means on each wheel flexible in a direction transverse to rotation and axially self-adjustable connecting it to the adjacent wheel in a driving connection therewith, a stator surrounding the rotor and including radially extending vanes thereon co-operating with the rotor vanes, the stator and rotor defining a working fluid passage therebetween through the vanes, a separate annular recess containing pressurized air in the stator opposite the peripheral shroud on each wheel, each shroud extending into its opposite recess to form an air bearing therewith and support each wheel independently in the stator solely by air.

10. A rotor and stator construction for a gas turbine type powerplant axial flow compressor comprising, a rotor including a plurality of axially aligned and axially spaced wheel disks, compressor rotor vanes radially extending from the periphery of each wheel, a peripheral surface on each wheel radially inward of its rotor vanes, torque transmitting means on each wheel flexible in a direction transverse to rotation and axially self-adjustable connecting it to the adjacent wheel in a driving connection therewith, a stator surrounding the rotor and including radially extending vanes thereon co-operating with the rotor vanes, the stator and rotor defining a working fluid passage therebetween through the vanes, a continuous annular recess containing pressurized air around the inner periphery of the stator vanes, the peripheral surface on each wheel extending into the annular recess to form an air bearing therewith and support each wheel independently in the stator solely by air during rotation.

References Cited in the file of this patent

UNITED STATES PATENTS

| | | |
|---|---|---|
| 1,906,715 | Penick | May 2, 1933 |
| 2,528,635 | Bell et al. | Nov. 7, 1950 |
| 2,623,353 | Gerard | Dec. 30, 1952 |
| 2,675,174 | McDowall et al. | Apr. 13, 1954 |
| 2,702,687 | Ledwith | Feb. 22, 1955 |
| 2,795,393 | Halford et al. | June 11, 1957 |
| 2,922,618 | Paulson | Jan. 26, 1960 |
| 2,963,268 | Smile | Dec. 6, 1960 |

FOREIGN PATENTS

| | | |
|---|---|---|
| 668,434 | Great Britain | Mar. 19, 1952 |